(12) United States Patent
Epaud et al.

(10) Patent No.: US 11,465,536 B2
(45) Date of Patent: Oct. 11, 2022

(54) SET OF SEATS AND MOTOR VEHICLE COMPRISING SUCH A SET OF SEATS

(71) Applicant: FAURECIA Sièges d'Automobile, Nanterre (FR)

(72) Inventors: David Epaud, Lardy (FR); Farouk Bouzid, Bretigny sur Orge (FR); Mathieu Cluet, Etampes (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 490 days.

(21) Appl. No.: 16/577,544

(22) Filed: Sep. 20, 2019

(65) Prior Publication Data

US 2020/0101867 A1 Apr. 2, 2020

(30) Foreign Application Priority Data

Oct. 2, 2018 (FR) ..................................... 18 59138

(51) Int. Cl.
*B60N 2/01* (2006.01)
*B60N 2/02* (2006.01)
(Continued)

(52) U.S. Cl.
CPC ........... *B60N 2/012* (2013.01); *B60N 2/0232* (2013.01); *B60N 2/065* (2013.01); *B60N 2/14* (2013.01); *B60N 2/206* (2013.01); *B60N 2/2231* (2013.01); *B60N 3/004* (2013.01); *B60N 2002/0236* (2013.01)

(58) Field of Classification Search
CPC . B60N 2/01; B60N 2/012; B60N 2/32; B60N 2/206; B60N 2/3063; B60N 2/3002; B60N 2/12; B60N 2/14; B60N 2/2231; B60N 2/065; B60N 2002/0236;
(Continued)

(56) References Cited

U.S. PATENT DOCUMENTS 2,997,335 A 8/1961 May
5,951,084 A * 9/1999 Okazaki ................. B60N 2/793
296/37.16
(Continued)

FOREIGN PATENT DOCUMENTS

EP 0949116 A1 10/1999
FR 3008934 A1 1/2015
JP 2003080982 3/2003

OTHER PUBLICATIONS

French Preliminary Search Report for French Patent App. No. FR1859138 dated May 6, 2019, BET190311 FR ‖ x pages.

*Primary Examiner* — Gregory A Blankenship
(74) *Attorney, Agent, or Firm* — Barnes & Thornburg LLP

(57) ABSTRACT

A motor vehicle comprises two front seats aligned in a transverse direction, and at least one rear seat. Said at least one rear seat comprises a seating portion with a seating portion frame, a backrest with a backrest frame. The backrest frame is pivotable relative to the seating portion frame about a first transverse axis, between at least one deployed position for receiving an occupant of the seat and a folded position in which the backrest frame is folded down to face the seating portion frame. Said at least one rear seat is adapted to have a configuration in which said at least one rear seat is in said folded position and the backrest of said at least one rear seat extends at least partly between the two front seats.

19 Claims, 8 Drawing Sheets

(51) Int. Cl.
  *B60N 2/20* (2006.01)
  *B60N 2/32* (2006.01)
  *B60N 2/06* (2006.01)
  *B60N 2/14* (2006.01)
  *B60N 2/22* (2006.01)
  *B60N 3/00* (2006.01)

(58) Field of Classification Search
  CPC .. B60N 2002/0232; B60N 3/004; B60N 3/01;
  B60N 3/002
  USPC ........................................................ 296/64
  See application file for complete search history.

(56) References Cited

U.S. PATENT DOCUMENTS

| | | | |
|---|---|---|---|
| 6,220,660 B1 | 4/2001 | Bedro | |
| 6,572,171 B1* | 6/2003 | Pautz | B60N 2/3065 |
| | | | 296/65.09 |
| 7,748,766 B2* | 7/2010 | Villeminey | B60N 3/004 |
| | | | 296/65.01 |
| 8,113,567 B2* | 2/2012 | Yamashita | B60N 2/3093 |
| | | | 296/65.09 |
| 8,376,435 B2* | 2/2013 | Dexter | B60N 3/102 |
| | | | 296/64 |
| 11,001,172 B2* | 5/2021 | Cluet | B60N 2/3011 |
| 11,040,641 B2* | 6/2021 | Epaud | B60N 2/3011 |
| 11,254,245 B2* | 2/2022 | Epaud | B60N 2/3011 |
| 2005/0269830 A1 | 12/2005 | Epaud | |
| 2006/0226670 A1* | 10/2006 | Bernstein | B60R 11/02 |
| | | | 296/64 |
| 2007/0126273 A1* | 6/2007 | Jasinski, II | B60N 3/004 |
| | | | 297/378.1 |
| 2007/0158979 A1 | 7/2007 | Saberan | |
| 2008/0001424 A1* | 1/2008 | Gardiner | B60N 2/06 |
| | | | 296/64 |
| 2009/0058152 A1* | 3/2009 | Orlo | B60N 2/206 |
| | | | 297/163 |
| 2009/0072572 A1* | 3/2009 | Scheinberg | B60N 2/206 |
| | | | 296/64 |
| 2009/0179450 A1* | 7/2009 | Brown | B60N 2/233 |
| | | | 296/65.01 |
| 2010/0102585 A1* | 4/2010 | Kato | B60N 2/68 |
| | | | 296/64 |
| 2011/0031772 A1* | 2/2011 | Mabuchi | B60N 2/01 |
| | | | 296/64 |
| 2013/0062903 A1* | 3/2013 | Mather | B60N 2/309 |
| | | | 296/64 |
| 2019/0001841 A1* | 1/2019 | Vanel | B60N 2/14 |
| 2019/0031055 A1* | 1/2019 | Line | B60N 2/32 |
| 2019/0389335 A1* | 12/2019 | Epaud | B60N 2/3065 |
| 2020/0101867 A1* | 4/2020 | Epaud | B60N 2/206 |
| 2020/0101873 A1* | 4/2020 | Cluet | B60N 2/206 |
| 2021/0078455 A1* | 3/2021 | Hwang | B60N 2/015 |

* cited by examiner

SET OF SEATS AND MOTOR VEHICLE COMPRISING SUCH A SET OF SEATS

PRIORITY CLAIM

This application claims priority to French Patent Application No. FR 18 59138, filed Oct. 2, 2018, which is expressly incorporated by reference herein.

BACKGROUND

The present disclosure relates to a vehicle, and particularly to a motor vehicle. More particularly, the present disclosure relates to seat included in the motor vehicle.

SUMMARY

According to the present disclosure, a motor vehicle provides increased comfort to the occupants of front seats of the motor vehicle.

In illustrative embodiments, a motor vehicle comprises a chassis defining a passenger compartment with a floor, two front seats aligned in a transverse direction in the passenger compartment and fixed to the floor, and at least one rear seat fixed to the floor, said at least one rear seat comprising a seating portion with a seating portion frame, a backrest with a backrest frame, the backrest frame being mounted so as to pivot relative to the seating portion frame about a first transverse axis, between at least one deployed position for receiving an occupant of the seat and a folded position in which the backrest frame is folded down to face the seating portion frame, vehicle wherein said at least one rear seat is adapted to have a configuration in which said at least one rear seat is in said folded position and the backrest of said at least one rear seat extends at least partly between the two front seats.

In illustrative embodiments, the backrest of the at least one rear seat can thus be used as a console or a table, by the occupants of one or more front seat(s). This use may take place in particular when the motor vehicle is stopped, or during autonomous operation of the motor vehicle in the case where the motor vehicle is an autonomous vehicle.

In illustrative embodiments, the motor vehicle has one or more of the following features, alone or in combination:

said at least one rear seat can only be placed in said configuration when the two front seats are oriented in converging directions;

the two front seats are pivoted about respective substantially vertical axes to enable at least partial passage of said at least one rear seat between the two front seats;

said at least one rear seat and/or the two front seats is/are fixed to the floor via a slide mechanism;

said at least one rear seat comprises, on each side of said at least one rear seat, a first and a second connecting rods intended to be fixed on a support of the seat so as to be pivotable about a respective transverse axis in order to raise the backrest frame relative to said support of the seat.

In illustrative embodiments, said at least one rear seat comprises a flange on each side, and a device for tilting the backrest frame relative to the flanges, the tilting device preferably being discontinuous;

on each side of said at least one rear seat, the first and second connecting rods are fixed to the flange so as to be pivotable about a respective transverse axis;

the seating portion frame of said at least one rear seat is fixed to a third connecting rod so as to be pivotable about a transverse axis, the third connecting rod further being intended to be fixed on a support of the seat so as to be pivotable about a transverse axis;

said at least one rear seat comprises a latch, preferably fixed to the flange where appropriate, adapted to lock the position of the flange relative to a support of the seat;

the motor vehicle comprises an actuator for adjusting the angular position of the backrest frame relative to the flanges and/or an actuator for adjusting the angular position of the first and second connecting rods relative to a support of the seat;

the motor vehicle comprises a support of said at least one rear seat, support to which are fixed the first, second, and third connecting rods, where appropriate, so as to be pivotable about a respective transverse axis, the support of the seat being or preferably comprising a rail of a slide mechanism fixed to the floor of the motor vehicle;

the motor vehicle further comprises at least two other rear seats, the at least two other rear seats being arranged one on each side of said at least one rear seat;

said at least one rear seat comprises a retractable tray device, the retractable tray device comprising a frame structure, at least one tray, an electric motor fixed to the frame structure, a worm screw rotated by the electric motor, and a slider mounted on the worm screw, the slider being integral with the tray so that the rotation of the worm screw causes displacement in translation of the slider along the worm screw, and consequently of the tray relative to the frame structure, substantially within the plane of the tray, the frame structure of the retractable tray device being fixed on the backrest or being formed by the backrest;

the frame structure defines a rectilinear slot for guiding the slider in translation;

the frame structure has a slot for guiding a pin integral with the tray, along a curved path;

the retractable tray device further comprises a shell, preferably substantially planar, the tray being interposed between the frame structure and the shell;

the retractable tray device comprises a second tray, the two trays preferably being symmetrical with respect to a plane normal to a plane of extension of the two trays, the retractable tray device even more preferably comprising a second motor, a second worm screw, a second slider, and where appropriate a second pin integral with the second tray, where appropriate the frame structure defining a second rectilinear slot and/or a second curved slot;

the tray(s) is/are adapted to be deployed in front of the front seats; and said at least one rear seat further comprises a headrest, fixed to the backrest frame, the headrest preferably being movable relative to the backrest frame.

In illustrative embodiments, a set of seats for a motor vehicle, fixed on a floor, comprising two front seats aligned in a transverse direction and fixed to the floor and at least one rear seat fixed to the floor, said at least one rear seat comprising a seating portion with a seating portion frame, a backrest with a backrest frame, the backrest frame being mounted so as to pivot relative to the seating portion frame about a first transverse axis, between at least one deployed position for receiving an occupant of the seat and a folded position in which the backrest frame is folded down to face the seating portion frame, wherein said at least one rear seat is adapted to have a configuration in which said at least one rear seat is in said folded position and the backrest of said at least one rear seat extends at least partly between the two front seats.

In illustrative embodiments, the set of seats may have the same features recited above regarding a motor vehicle, alone or in combination.

In illustrative embodiments, a motor vehicle is further described, which comprises a chassis defining a passenger compartment with a floor, and a set of seats as disclosed above in any of its combinations, wherein the floor of the set of seats consists in the floor of the passenger compartment.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically represents a side view of a vehicle seat assembly in a first position called the deployed position;

Figure 9:
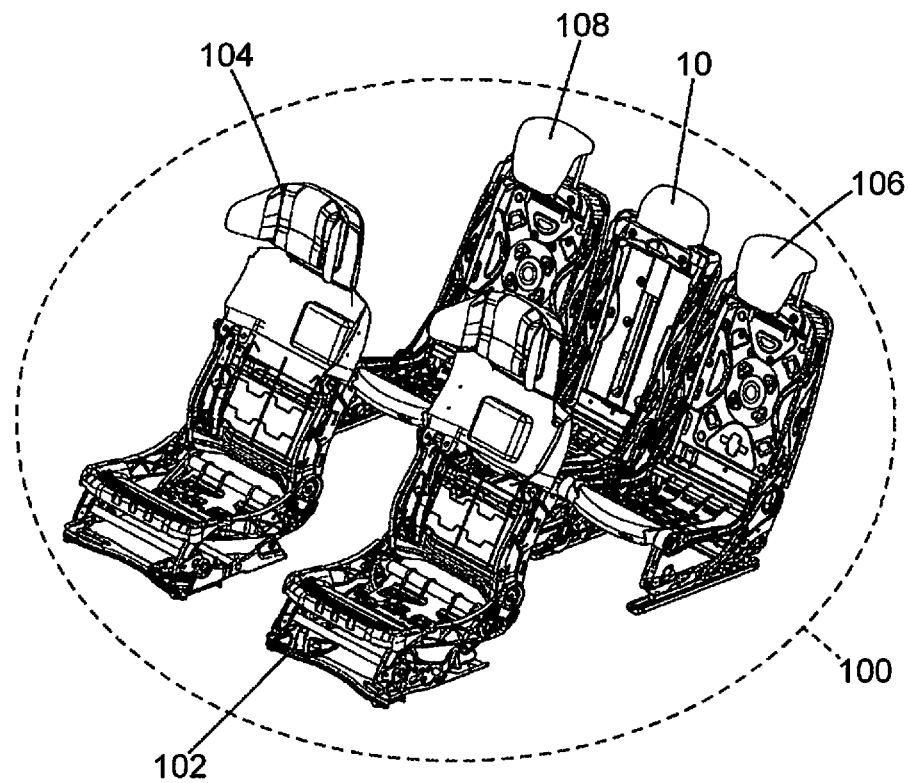
Figure 10:
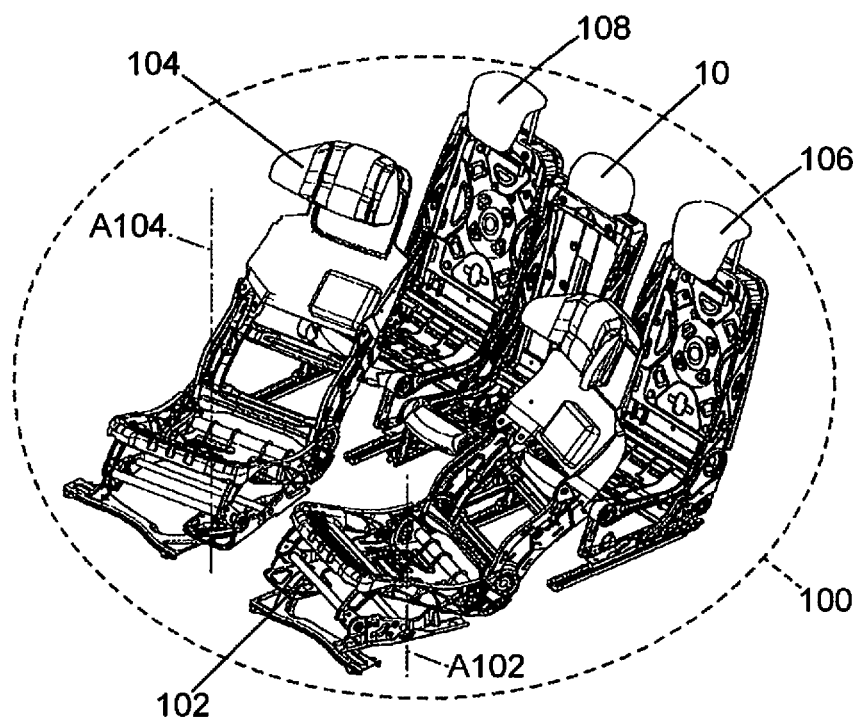
Figure 11:
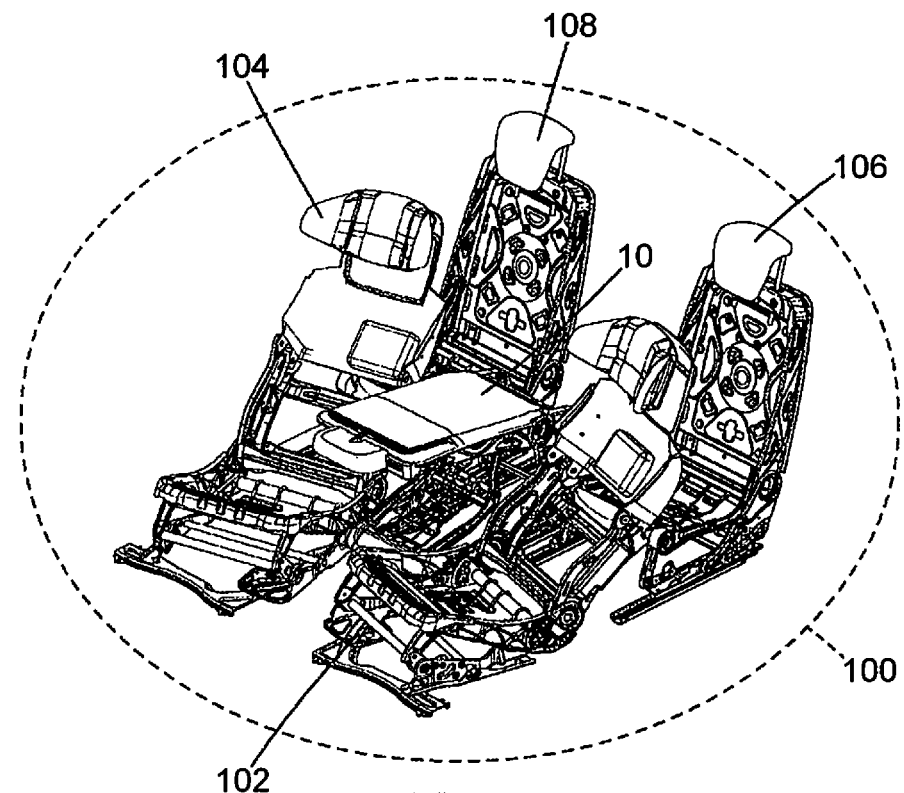
Figure 12:
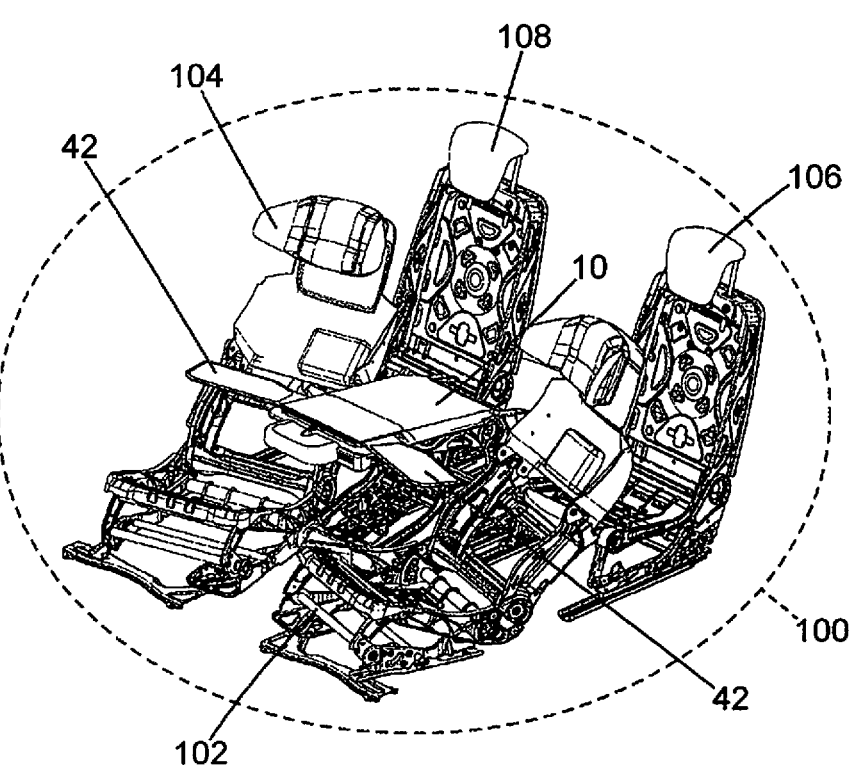

FIG. 9 schematically represents a perspective view of an arrangement of five seats of a motor vehicle, in a deployed position, the central rear seat being a seat as illustrated in FIGS. 1 to 4;

FIG. 10 schematically represents a perspective view of the arrangement of FIG. 9, where the two front seats have been rotated relative to a respective substantially vertical axis;

FIG. 11 schematically represents a perspective view of the arrangement of FIG. 10, where the central rear seat has been folded into its console position and advanced relative to the other rear seats, so that the backrest of the central rear seat is located between the two front seats; and FIG. 12 schematically represents a perspective view of the arrangement of FIG. 10, where the trays in the backrest of the central rear seat have been deployed.

DETAILED DESCRIPTION

In the different figures, the same references designate identical or similar elements. For brevity, only the elements that are useful to understanding the embodiment described are represented in the figures and are described in detail below.

In the description which follows, when reference is made to absolute position qualifiers such as the terms front, rear, top, bottom, left, right, etc., or relative qualifiers such as the terms above, below, upper, lower, etc., or to orientation qualifiers such as horizontal, vertical, etc., unless otherwise specified these are in reference to the orientation of the figures or of a seat in its normal position of use.

Figure 1:
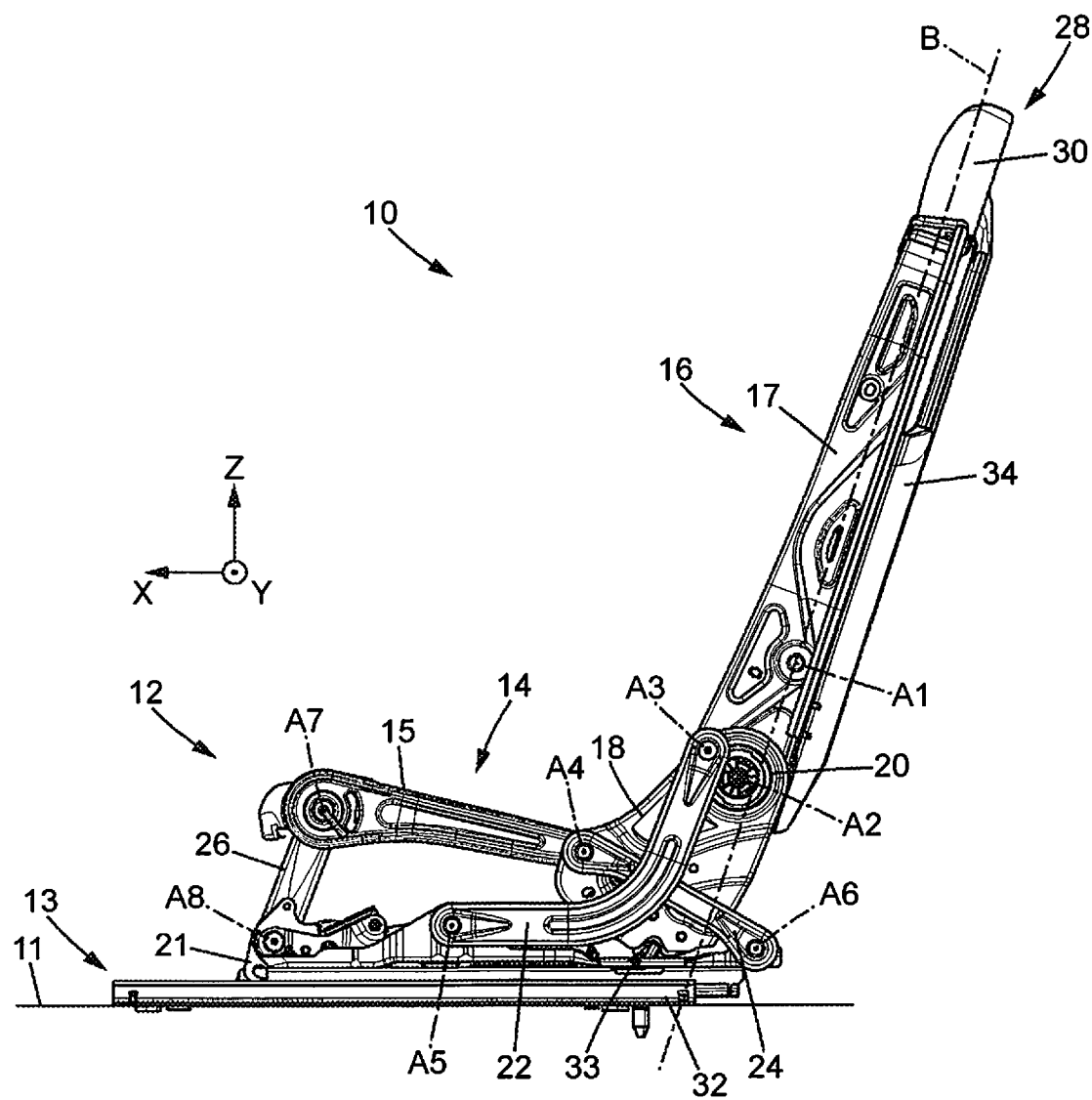

FIG. 1 schematically represents a motor vehicle seat assembly 10 comprising a motor vehicle seat 12 mounted on a slide mechanism 13 for attaching the vehicle seat device 12 to the floor 11 of a motor vehicle. The floor 11 is for example formed by the chassis of the motor vehicle. Here, the motor vehicle seat 12 is a rear seat.

In the following, the longitudinal direction X extends in the longitudinal direction of the seat 12. The longitudinal direction of the seat 12 is considered to be the same as the longitudinal direction of the motor vehicle in which the seat 12 is mounted. This longitudinal direction X corresponds to the normal direction of travel of the vehicle. The transverse direction Y is the transverse direction of the seat 12. The transverse direction of the seat 12 thus corresponds to the transverse or lateral direction of the motor vehicle. This transverse direction corresponds to a direction perpendicular to the normal direction of travel of the vehicle. Finally, the vertical direction Z is a vertical direction of the seat 12, perpendicular to the longitudinal and transverse directions.

The seat 12 comprises a seating portion 14 with a seating portion frame 15, and a backrest 16 with a backrest frame 17. The backrest frame 17 is mounted so as to pivot relative to the seating portion frame 15 about a first transverse axis A1, parallel to direction Y.

In the following, one side of the motor vehicle seat 12 is described, it being understood that the two sides of the seat 12 are substantially identical.

The backrest frame 17 is also mounted so as to pivot about a second transverse axis A2 relative to a flange 18. In this case, a hinge mechanism 20 is interposed between the flange 18 and the backrest frame 17. The hinge mechanism 20 is for example a discontinuous mechanism, in other words it is adapted to adjust the angular position of the backrest frame 17 relative to the flange 18 into a finite number of discrete positions. The hinge mechanism 20 may advantageously have a disengaged mode for folding down the backrest frame 17, for example into the position shown in FIG. 2, as opposed to the engaged mode in which the hinge mechanism allows adjusting the tilt of the backrest frame 17. Preferably, the hinge mechanism 20 is electrically controlled. Thus, the adjustment of the tilt of the backrest frame 17 is achieved by means of control buttons of the hinge mechanism 20. To do this, the hinge mechanism 20 may for example comprise a drive motor. The drive motor can then be controlled by means of the control buttons. Alternatively, the hinge mechanism 20 may in particular be a hook-cable type of system, comprising a cam and having an angular adjustment range in which the hinge mechanism is not locked (disengaged position), and another adjustment range, distinct from the first, in which the hinge mechanism can be locked (engaged position). For example, the hinge mechanism is unlocked in order to adjust its angular position, the adjustment being made while keeping the hinge mechanism unlocked. Once a satisfactory angular position is reached, the hinge mechanism 20 is locked once again.

In the illustrated example, the flange 18 is connected to a support 21 of the seat, by means of first and second connecting rods 22, 24. Each connecting rod 22, 24 is mounted on the flange 18 near a first end so as to pivot about a respective third and fourth transverse axis A3, A4. Each rod 22, 24 is also mounted, near its second end, on the support 21, so as to pivot about a respective fifth and sixth transverse axis A5, A6.

An actuator may advantageously be provided for adjusting the angular position of the connecting rods 22, 24 relative to the support 21 of the seat. For example, an actuating cylinder, in particular an electric cylinder, may be provided between the support 21 of the seat and one of the connecting rods 22, 24. In this case, the cylinder is advantageously mounted to rotate freely about transverse axes at each of its ends, with respect to the support 21 and with respect to the connecting rod 22, 24.

Here, a third connecting rod 26 connects the seating portion frame 15 and the support 21. This third connecting rod 26 is mounted to rotate freely about a seventh transverse axis A7 with respect to the seating portion frame 15, near a first end. Near its second end, here the third connecting rod 26 is mounted to rotate freely with respect to the support 21, about an eighth transverse axis A8.

Furthermore, the seat 12 comprises a headrest 28 with a headrest frame 30. The headrest frame 30 is mounted on the backrest frame 17. For example, the headrest frame 30 can be moved relative to the backrest frame 17, in particular in translation, to adjust the height of the headrest 28.

Finally, in the example illustrated, the support 21 of the seat forms a rail of the slide mechanism 13, in this case the movable rail, the support 21 being received in a rail 32 of the slide mechanism 13, in this case the fixed rail fixed to the floor 11. The slide mechanism 13 thus allows adjusting the longitudinal position of the seat 12 in the vehicle.

Figure 2:
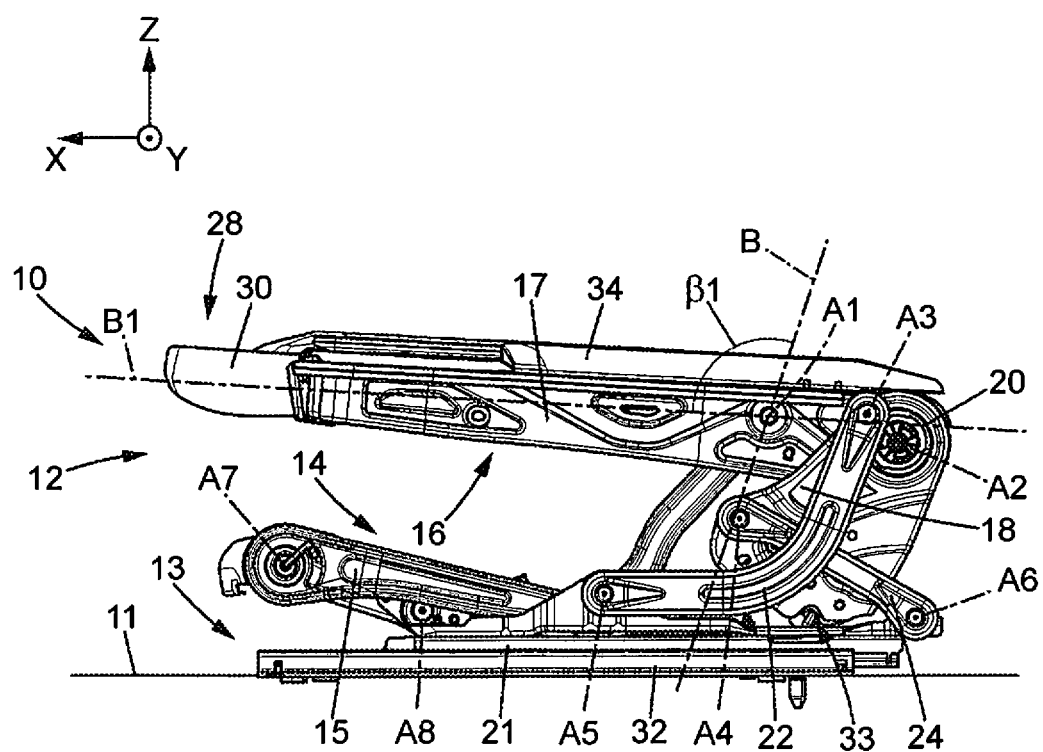
FIG. 2 is a side view of the seat assembly of FIG. 1 in a second position called the storage position.
Figure 3:
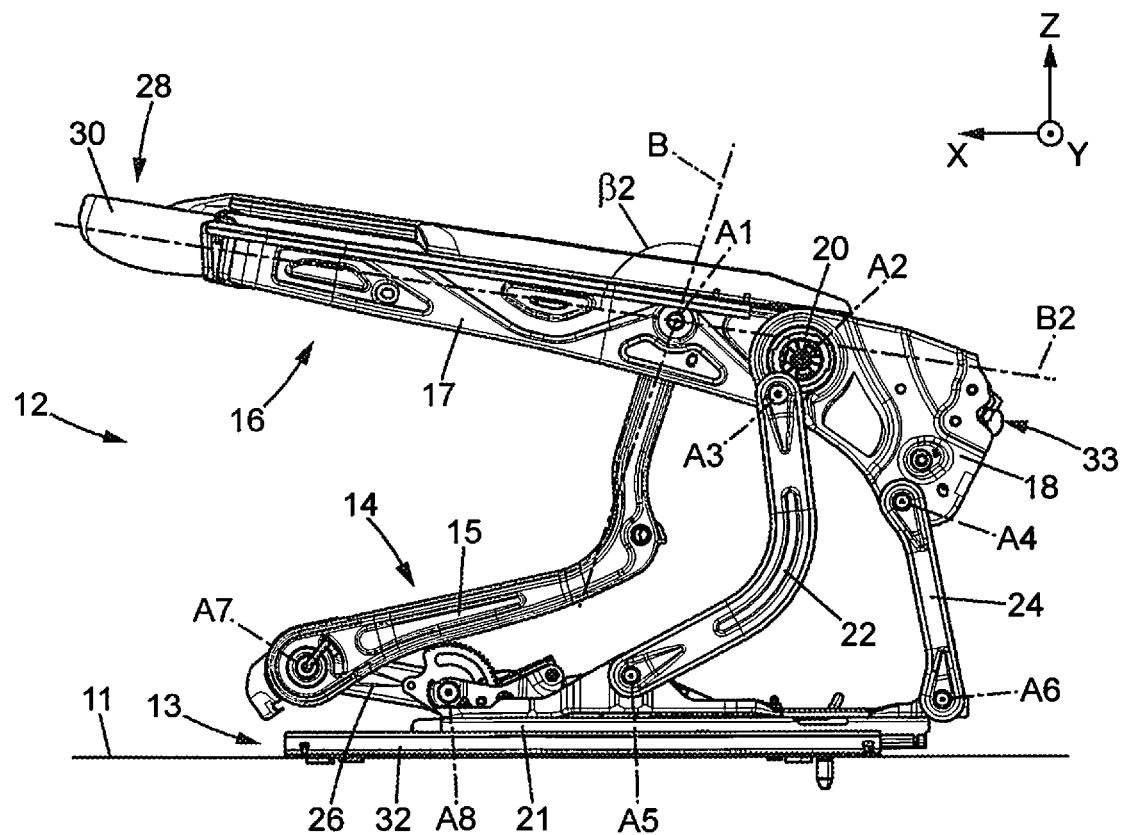
FIG. 3 represents a side view of the seat assembly of FIGS. 1 and 2, in a third position called the console position.

As illustrated in FIGS. 1 to 3, the seat assembly 10 just described can take three distinct positions in particular, corresponding to three different uses.

In a first position illustrated in FIG. 1, called the deployed position, the seat 12 is in a position to receive an occupant of the seat 12. In this position, the backrest frame 17 and the seating portion frame 15 form an angle substantially equal to 90° or even greater than 90°. For example, the angle between the backrest frame 17 and the seating portion frame 15 is greater than or equal to 80°, preferably greater than or equal to 85° and/or less than or equal to 120°, preferably less than or equal to 115°.

In this deployed position, the first and second connecting rods 22, 24 are in a low position. The first and second connecting rods 22, 24 can then form a substantially zero angle, for example less than 5°, with the support 21 of the seat 12.

In contrast, the third connecting rod 26 is in a raised position, the angle between the third connecting rod 26 and the support 21 of the seat here being substantially equal to 90°. For example, the angle between the third connecting rod 26 and the support 21 of the seat is greater than or equal to 60°, preferably greater than or equal to 70° and/or less than or equal to 130°, preferably less than or equal to 110°. Thus, the seating portion frame 15 is in a high position, in other words at a distance from the support 21 of the seat. Most importantly, the seating portion frame 15 is then at a distance from the floor 11 of the motor vehicle such that the seat 10 is in a position allowing an occupant to sit on it comfortably.

This position is maintained for example by locking the actuator for adjusting the angular position of the first and second connecting rods 22, 24, in its corresponding position (in particular in its corresponding length).

Additionally or alternatively, this deployed position is maintained by locking the position of the flange 18 on the support 21, the rail 32 of the slide mechanism 13, or the floor 11 of the motor vehicle, by means of a latch 33. The latch 33 may also engage with a bar integral with the support 21, the rail 32, or the floor 11.

In this position, the tilt of the backrest frame 15 can be adjusted by means of the hinge mechanism 20. There are thus numerous deployed positions.

In addition, for safety purposes, the angular position of the third connecting rod 26 can be locked in its corresponding angular position, by means of any locking device accessible to those skilled in the art. In particular, a locking catch may be provided.

The hinge 20 can be locked in the position of FIG. 1. In this deployed position of FIG. 1, the back of the backrest frame 17 can extend in a direction B.

FIG. 2 illustrates a storage position of the seat 12.

In this storage position, aimed at increasing the space in the trunk for example, the position of the first and second connecting rods 22, 24 is unchanged. However, the angular position of the backrest frame 17 has been modified, so that the backrest frame 17 is folded down, in the current case into a substantially horizontal position, and is placed facing the seating portion frame 15. In order to reach this position of the backrest frame 17, for example the hinge mechanism 20 has been placed in the disengaged position and the backrest frame 17 has been folded down. Thus, in a preferred manner, the hinge mechanism 20 is preferably free to move so that the backrest 16 is in principle movable relative to the seat 14.

In the example illustrated, the back of the backrest frame 17 extends in a direction B1 forming with the axis B, corresponding to the deployed position, an angle β1 comprised for example between 100 and 105°, advantageously between 101 and 104°.

The folding down of the backrest frame 17 is accompanied by a displacement of the seating portion frame 15 and of the third connecting rod 26. In the storage position, in fact, the third connecting rod 26 is more inclined relative to the support 21 than in the deployed position. In other words, the angle between the third connecting rod 26 and the support 21 is greater in the storage position than in the deployed position. This brings the seating portion frame 15 closer to the support 21 and/or to the floor 11. It is then possible to maintain the position of the seat by locking the angular position of the third connecting rod 26 relative to the support 21. Here again, any suitable locking system may be implemented, in particular a locking catch.

In this storage position, the latch 33 is preferably always in its position that locks the flange 18 with respect to the support 21.

Finally, in the console position, illustrated in FIG. 3, the first and second connecting rods 22, 24 are pivoted with respect to their positions corresponding to the deployed and storage positions of the seat, previously described, in order to raise the flange 18 relative to the support 21 of the seat and therefore to the floor 11. To do this, the first and second connecting rods 22, 24, the support 21, and the flange 18 may for example substantially form a deformable parallelogram. The raising of the flange 18 relative to the support 21 is thus controlled by the actuator for adjusting the angular position of the first and second connecting rods 22, 24. In this console position, the backrest frame 17 is still substantially facing the seating portion frame 15.

To transition to the console position, the latch 33 is unlocked beforehand.

To maintain the position of the backrest frame 17, the hinge mechanism 20 is in a position of locking the angle of the backrest frame 17 relative to the flange 18. For example, this position of the backrest frame 17 corresponds to the one in which the back of the backrest frame 17 is substantially horizontal. Substantially horizontal is understood here to mean forming an angle of plus or minus 10° relative to the horizontal direction. In this position, the backrest frame 17 can thus advantageously be used as a console, table, or armrest, for occupants of vehicle seats adjacent to the seat 12.

In this console position, the angular position of the third connecting rod 26 relative to the support 21 can also be locked. Any suitable device for locking the angular position of the third connecting rod 26 relative to the support 21 may be used. In particular, a locking catch may be used.

In the position illustrated in FIG. 3 by way of example, the angle between the direction B2 of the back of the backrest frame 17, and the direction B of this same back of the backrest frame 17 in the deployed position, forms an angle β2 which may for example be greater than or equal to 100°, preferably greater than or equal to 107° and/or less than or equal to 115°, preferably less than or equal to 110°. The angle β2 here is substantially equal to 108°, more precisely equal to 108.75°.

Figure 4:
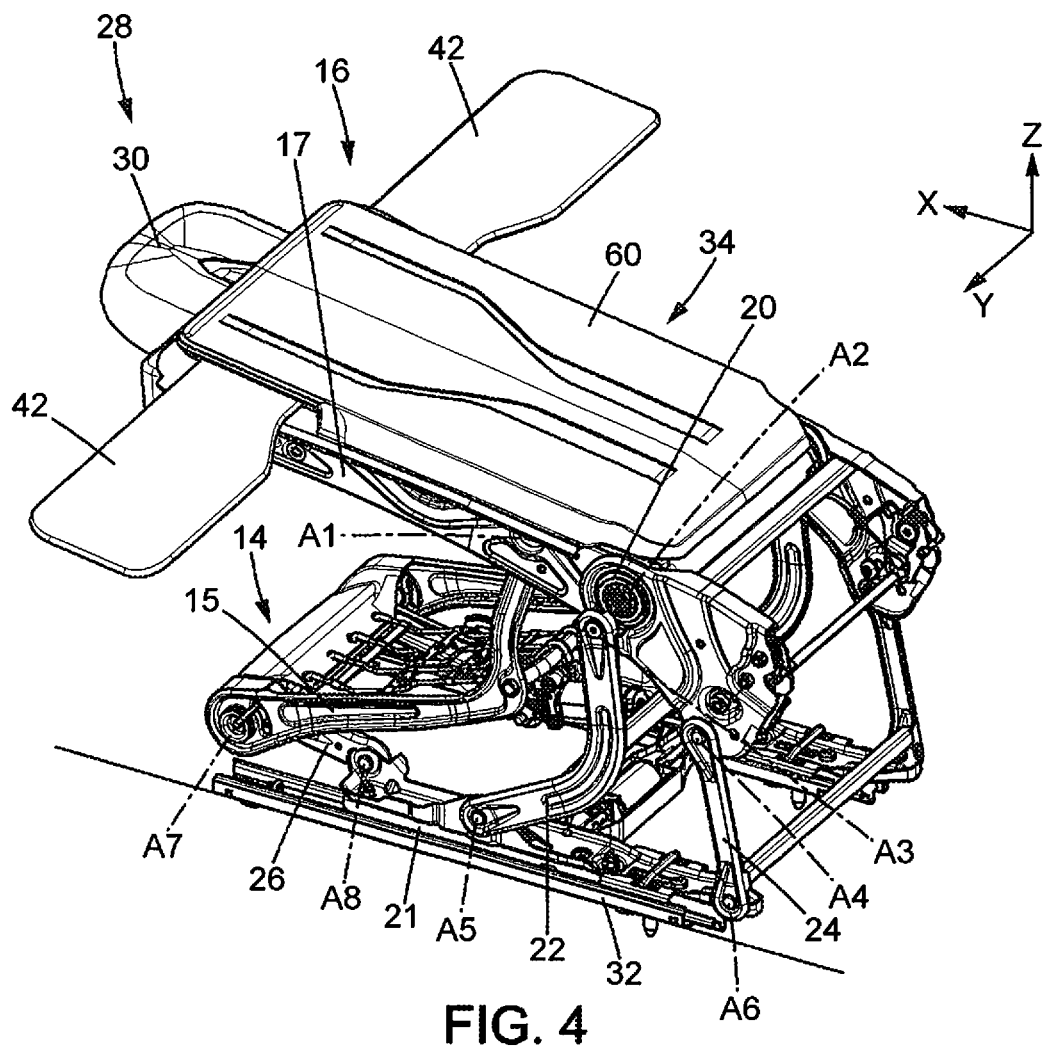
FIG. 4 represents a perspective view of the seat of FIGS. 1 to 3 in a position similar to that of FIG. 3, with the trays deployed.

In addition, as is more particularly visible in FIG. 4, the seat 12 is provided, on its backrest 16, with a retractable tray device 34 in which the trays 42 are deployed in FIG. 4.

This retractable tray device 34 is described in more detail below, with reference to FIGS. 5 to 8.

The retractable tray device 34 firstly comprises a frame structure 36, fixed with respect to the backrest 16 of the seat 12. According to a variant that is not illustrated, the frame structure 36 is formed by the backrest frame 17. The frame structure 36 is illustrated in particular in FIG. 8, where one can see that the frame structure 36 is substantially T-shaped. The frame structure 36 is substantially planar. The frame structure 36 has a first pair of rectilinear slots 38*a*, 38*b* extending for substantially the entire length of the frame structure 36. The frame structure 36 also has a second pair of curved slots 40*a*, 40*b*. Slots 40*a*, 40*b* comprise a first portion, near the rectilinear slots 38*a*, 38*b*, which extends substantially parallel to slots 38*a*, 38*b*, and a second portion which progressively moves away from the rectilinear slots 38*a*, 38*b* towards the exterior of the frame 36. Slots 40*a*, 40*b* thus extend from a first end near which they are substantially parallel, to a second end near which they diverge.

The retractable tray device 34 further comprises two retractable trays 42. Here these retractable trays 42 have a substantially rectangular shape with rounded corners. Each tray 42 further comprises two through-openings 44, 46: a first opening 44 is arranged near one corner of the tray 42, and a second opening 46 is arranged at a distance from the corner where the first opening 44 is made, and preferably at a distance from the edge 47 of the tray 44 that is greater than the distance between the first opening 44 and the edge 47 of the tray 42.

The retractable tray device 34 further comprises a control device 48 for controlling the retraction and deployment of each tray 42 independently of one another. Here the control device 48 is electric. The control device 48 is particularly visible in FIGS. 5 and 6.

Figure 5:
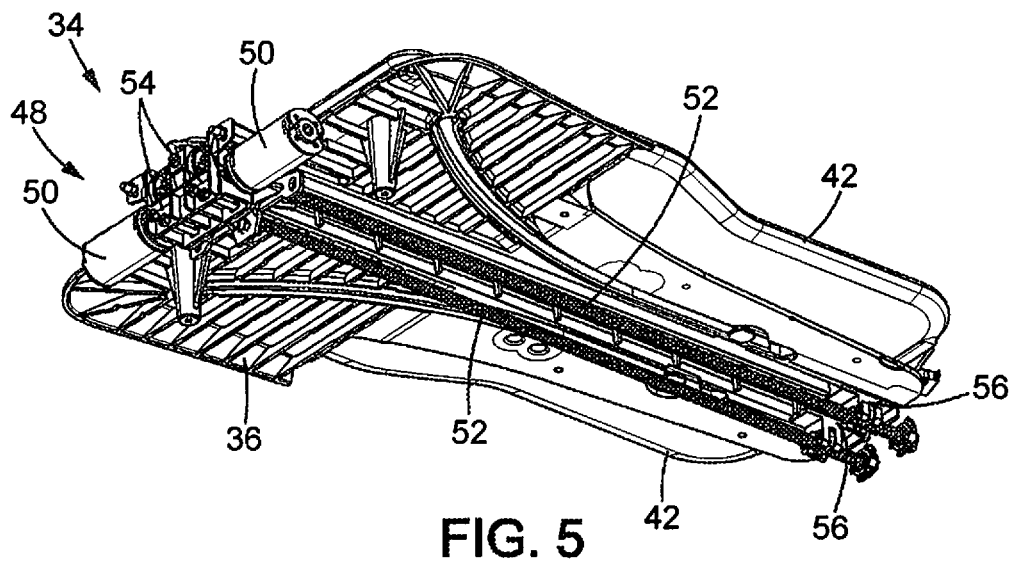
FIG. 5 is a perspective view of the retractable tray device of the seat of FIGS. 1 to 4.
Figure 6:
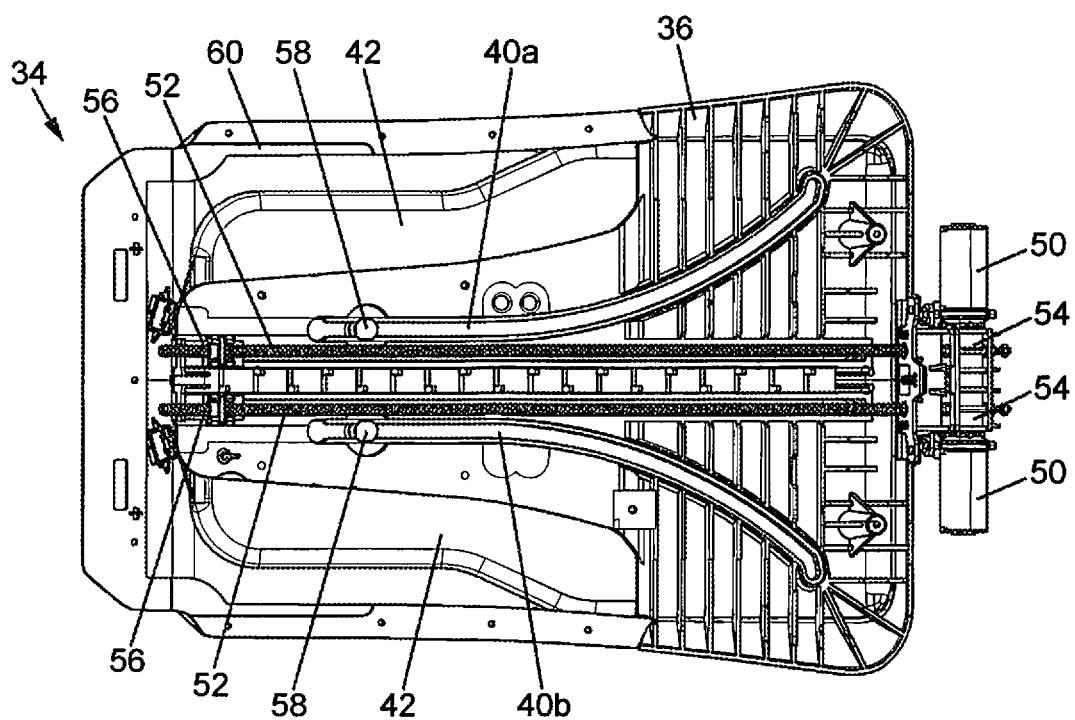
FIG. 6 is a view of the face of the retractable tray device of FIG. 5.
Figure 7:
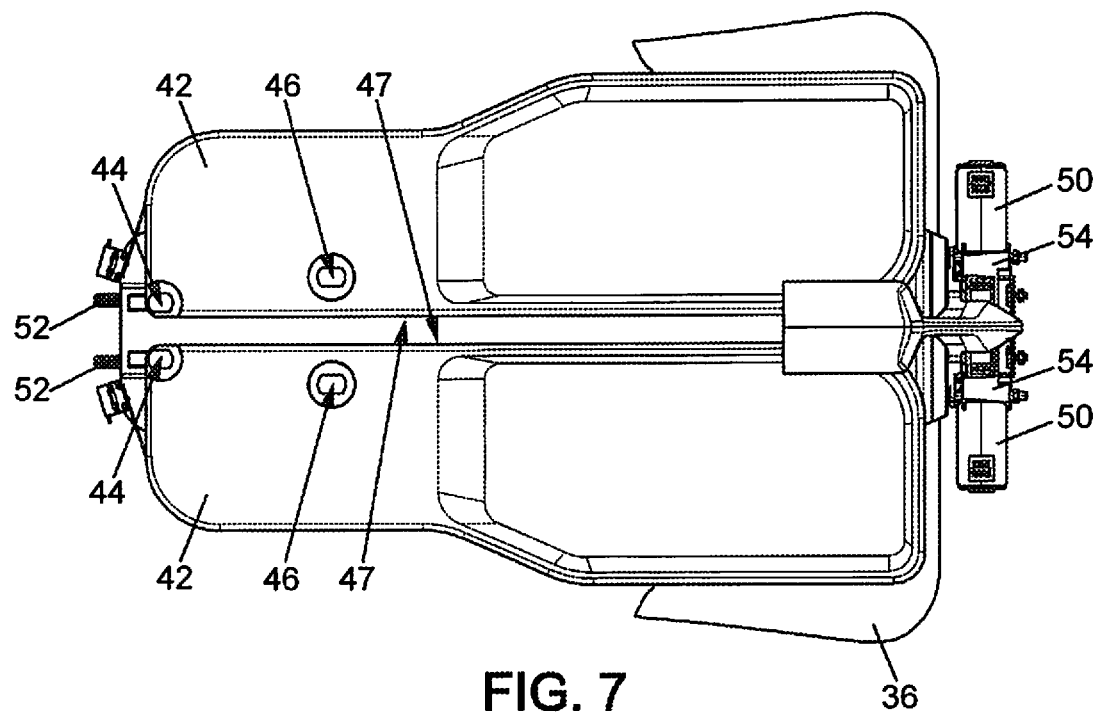
FIG. 7 is a view of the face retractable tray device of FIG. 5 that is opposite to the face shown in FIG. 6.
Figure 8:
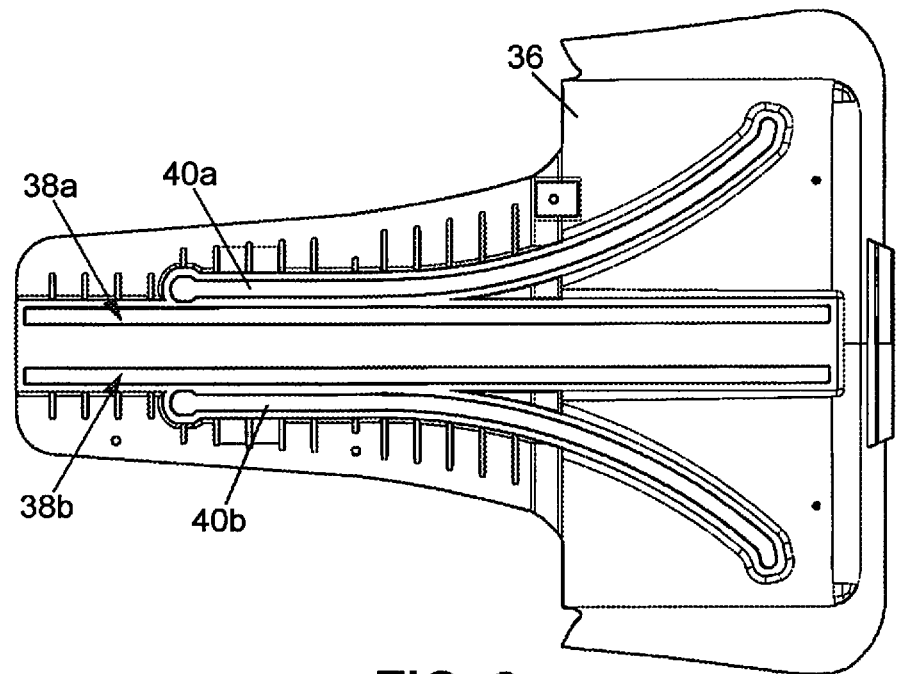
FIG. 8 is a view of the face of a support part (or frame structure) of the retractable tray device of FIG. 5.

The portion of the control device 48 that enables the deployment or retraction of a tray 42 is described below. To control the deployment or retraction of the two trays 42 independently of one another, the control device 48 may thus comprise the means described below but in duplicate, as shown in FIGS. 5 and 6 in particular.

The control device 48 first comprises an electric motor 50, for example fixed to the frame structure 36. This electric motor 50 rotates a worm screw 52, in this case via a reduction device 54. The worm screw 52 is arranged facing one of the two rectilinear slots 38*a*, 38*b* of the frame structure 36.

A slider 56 is fixed on the worm screw 52 such that the rotation of the worm screw 52 causes translation of the slider 56 relative to the worm screw. For example, the slider 56 comprises a housing for receiving a nut mounted on the worm screw 52. The slider 56 may for example be prevented from pivoting about the axis of rotation of the worm screw 52 by being received in one of the rectilinear slots 38*a*, 38*b*. In this case, the edges of the rectilinear slot 38*a*, 38*b* block the rotation of the slider 56, which then moves in translation in the rectilinear slot 38*a*, 38*b* which receives it. The slider 56 is thus guided in translation by the rectilinear slot 38*a*, 38*b*.

The slider 56 is also received in the first opening 44 of one of the two trays 42. The tray 42 is free to rotate with respect to the slider 56, within the plane of the tray 42.

Finally, a pin 58 is fixed to the tray 42, able to rotate freely relative to the tray 42. The pin 58 is also received in a slot 40*a*, 40*b*, the pin 58 being able to pivot in the slot 40*a*, 40*b*.

According to the illustrated example, the retractable tray device 34 further comprises a shell 60. The function of the shell 60 is essentially aesthetic. This shell 60 may be substantially flat to allow using the backrest 16 of the seat 12 as a table. The trays 42 preferably extend between the frame structure 36 and the shell 60.

The operation of the retractable tray device 34 is described below. The electric motor 50 causes rotation of the worm screw 52. This rotation of the worm screw 52 causes the slider 56 to move in translation along the worm screw 52. The translation of the slider 56 induces movement of the corner of the tray 42 that has the first opening 44 in proximity. The distance between the two openings 44, 46 in the tray 42 being fixed, the movement of the corner of the tray 42 also causes displacement of the tray 42 comprising a translation along the worm screw 52 and a rotation around the first opening 44. The shape of the slot 40*a*, 40*b* then serves to guide the tray between an extended position, visible in FIG. 4, and a retracted position corresponding to FIGS. 1 to 3. It should be noted here that the displacement of the trays 42 occurs substantially within the plane of these trays 42. To achieve this, the trays 42 can be guided in their movements between the frame structure 36 and the shell 60. The retractable tray device 34 is thus particularly compact. The retractable tray device 34 may in particular be wholly or partly received between two uprights of the backrest frame 17.

FIGS. 9 to 12 illustrate an exemplary implementation of the seat assembly 10 of FIGS. 1 to 4.

FIG. 9 thus schematically illustrates a motor vehicle 100 comprising two front seats 102, 104 aligned in a transverse direction, and three rear seats 12, 106, 108, whose central seat is a seat 12 of a seat assembly 10 as described above. The rear seats 12, 106, 108 are offset in the longitudinal direction X relative to the front seats 102, 104.

According to the illustrated example, the trays 42 of seat 12 can be used by the occupants of the front seats 102, 104. To do this, as illustrated in FIG. 10, the front seats 102, 104 are rotated about a respective substantially vertical axis A102, A104, so that the two front seats 102, 104 are oriented in convergent directions, preferably without facing each other, as illustrated in FIG. 10. This frees space between the two front seats 102, 104, this space allowing the passage of the central rear seat 12 between the two front seats 102, 104, or at least of the backrest 16 of said central rear seat 12. The central rear seat 12 is then in a position where the backrest is folded down, in particular into the console position of seat 12. Where appropriate, the longitudinal position of the central rear seat 12 relative to the front seats 102, 104 can be adjusted by translation of at least one among the front seats 102, 104 and said central rear seat 12.

In addition, the front seats 102, 104 may be in a position in which their backrest is tilted relative to their seating portion, for example by an angle greater than the tilt angle of the backrest in a driving position, this greater angle corresponding to a resting position of the occupants of the front seats 102, 104.

The backrest 16 of the central rear seat 12 can then be used as a table by the occupants of the front seats 102, 104.

Here, in addition, as the central rear seat 12 is provided with a retractable tray device 34, the trays 42 can then be deployed as illustrated in FIG. 12. The trays 42 are then deployed in front of the front seats 102, 104. The trays 42 are then usable by the occupants of the front seats 102, 104.

Alternatively, however, the trays of the central rear seat 12 may be used by the occupants of the rear seats 104, 106. To do this, for example, the central rear seat 12 is not moved longitudinally towards the front seats 102, 104. In this case, the backrest 16 of the central rear seat 12 may extend fully or partly behind the front seats 102, 104.

In particular, the seat support can take many forms. Thus, according to one particular example, the seat support is formed by the floor of the passenger compartment of the motor vehicle equipped with the seat.

There are seats that are foldable so that the backrest can be used as an armrest or as a table by occupants of neighboring seats. Such seats are used are rear seats of a motor vehicle.

Vehicle seats may also have a retractable tray in the backrest, the retractable tray being intended to be deployed when the seat is in a position such that the seat backrest is substantially horizontal, facing the seating portion of the seat. In this case, deployment of the tray is manual. Reference is hereby made to European Application No. EP0949116A, disclosure relating to use vehicle seats, which application is hereby incorporated in its entirety herein. Front seats of a motor vehicle may be equipped with an armrest, in particular on the side of the seat opposite the door enabling access to the seat.

The invention claimed is:

1. A set of seats for a motor vehicle, fixed on a floor, the set of seats comprising two front seats aligned in a transverse direction and fixed to the floor, and at least one rear seat fixed to the floor, said at least one rear seat comprising a seating portion with a seating portion frame, a backrest with a backrest frame, the backrest frame being mounted so as to pivot relative to the seating portion frame about a first transverse axis, between at least one deployed position for receiving an occupant of the seat and a folded position in which the backrest frame is folded down to face the seating portion frame, wherein said at least one rear seat is adapted to have a configuration in which said at least one rear seat is in said folded position and the backrest of said at least one rear seat extends at least partly between the two front seats, and
wherein said at least one rear seat can only be placed in said configuration when the two front seats are oriented in converging directions.

2. The set of seats of claim 1, wherein the two front seats are pivoted about respective substantially vertical axes to enable the at least partial passage of said at least one rear seat between the two front seats.

3. The set of seats of claim 1, wherein said at least one rear seat is fixed to the floor via a slide mechanism.

4. The set of seats of claim 1, wherein said at least one rear seat comprises, on each side of said at least one rear seat, a first and a second connecting rods intended to be fixed on a support of the seat so as to be pivotable about a respective transverse axis in order to raise the backrest frame relative to said support of the seat.

5. The set of seats of claim 1, wherein said at least one rear seat comprises a flange on each side, and a device for tilting the backrest frame relative to the flanges.

6. The set of seats of claim 5, wherein said at least one rear seat comprises a latch, adapted to lock the position of the flange relative to a support of the seat.

7. The set of seats of claim 4, wherein said at least one rear seat comprises a flange on each side, and a device for tilting the backrest frame relative to the flanges, and wherein on each side of said at least one rear seat, the first and second connecting rods are fixed to the flange so as to be pivotable about a respective transverse axis.

8. The set of seats of claim 4, wherein said at least one rear seat comprises a flange on each side, and a device for tilting the backrest frame relative to the flanges, said set of seats further comprising an actuator for adjusting the angular position of the backrest frame relative to the flanges and/or an actuator for adjusting the angular position of the first and second connecting rods relative to a support of the seat.

9. The set of seats of claim 1, wherein the seating portion frame of said at least one rear seat is fixed to a third connecting rod so as to be pivotable about a transverse axis, the third connecting rod being intended to be fixed on a support of the seat so as to be pivotable about a transverse axis.

10. The set of seats of claim 4, comprising a support of said at least one rear seat, support to which are fixed the first and second connecting rods, so as to be pivotable about a respective transverse axis.

11. The set of seats of claim 10, wherein the support of the seat comprises a rail of a slide mechanism fixed to the floor.

12. The set of seats of claim 1, further comprising at least two other rear seats, the at least two other rear seats being arranged one on each side of said at least one rear seat.

13. The set of seats of claim 1, wherein said at least one rear seat comprises a retractable tray device, the retractable tray device comprising a frame structure, at least one tray, an electric motor fixed to the frame structure, a worm screw rotated by the electric motor, and a slider mounted on the worm screw, the slider being integral with the tray so that the rotation of the worm screw causes displacement in translation of the slider along the worm screw, and consequently of the tray relative to the frame structure, substantially within the plane of the tray, the frame structure of the retractable tray device being fixed on the backrest or being formed by the backrest.

14. The set of seats of claim 13, wherein the frame structure defines a rectilinear slot for guiding the slider in translation.

15. The set of seats of claim 13, wherein the frame structure has a slot for guiding a pin integral with the tray, along a curved path.

16. The set of seats of claim 13, wherein the retractable tray device further comprises a shell, preferably substantially planar, the tray being interposed between the frame structure and the shell.

17. The set of seats of claim 13, wherein the retractable tray device comprises a second tray.

18. The set of seats of claim 13, wherein the tray is adapted to be deployed in front of the front seats.

19. A motor vehicle comprising
a chassis defining a passenger compartment with a floor, and the set of seats of claim 1,
wherein the floor of the set of seats consists in the floor of the passenger compartment.

* * * * *